(12) United States Patent
Brown et al.

(10) Patent No.: US 7,788,301 B2
(45) Date of Patent: Aug. 31, 2010

(54) METADATA DRIVEN USER INTERFACE

(75) Inventors: Craig Matthew Brown, Harbord (AU);
Andrew John Shellshear, Marrickville (AU); Rebecca Jayne Gorton, South Hobart (AU)

(73) Assignee: Canon Kabushiki Kaisha, Tokyo (JP)

( * ) Notice: Subject to any disclaimer, the term of this patent is extended or adjusted under 35 U.S.C. 154(b) by 373 days.

(21) Appl. No.: 11/153,386

(22) Filed: Jun. 16, 2005

(65) Prior Publication Data

US 2005/0289170 A1  Dec. 29, 2005

(30) Foreign Application Priority Data

Jun. 21, 2004  (AU)  ............... 2004903350

(51) Int. Cl.
*G06F 12/00* (2006.01)
(52) U.S. Cl. ............ 707/822; 707/828; 715/864; 715/273
(58) Field of Classification Search .......... 707/1, 707/2, 3, 100, 822, 828; 715/864, 273
See application file for complete search history.

(56) References Cited

U.S. PATENT DOCUMENTS

| | | | | |
|---|---|---|---|---|
| 5,295,230 A | * | 3/1994 | Kung | 706/59 |
| 5,652,876 A | * | 7/1997 | Ashe et al. | 703/26 |
| 5,710,899 A | * | 1/1998 | Eick | 715/764 |
| 6,243,724 B1 | | 6/2001 | Mander et al. | 715/526 |
| 6,308,168 B1 | | 10/2001 | Dovich et al. | 707/1 |
| 6,408,301 B1 | | 6/2002 | Patton et al. | 707/102 |
| 6,493,704 B1 | * | 12/2002 | Hichwa et al. | 707/3 |
| 7,533,116 B2 | * | 5/2009 | Lacy | 707/102 |
| 2006/0036568 A1 | * | 2/2006 | Moore et al. | 707/1 |

FOREIGN PATENT DOCUMENTS

| | | |
|---|---|---|
| EP | 1316879 A2 | 6/2003 |
| WO | WO 01.79964 A2 | 10/2001 |
| WO | WO 01/90949 A1 | 11/2001 |

\* cited by examiner

*Primary Examiner*—Cheyne D Ly
(74) *Attorney, Agent, or Firm*—Fitzpatrick, Cella, Harper & Scinto

(57) ABSTRACT

A method (800) of displaying one or more data attributes, is disclosed. The displayed data attributes is associated with one or more portions of data. The method (800) dynamically compiles a list of one or more data attribute types according to an analysis of the one or more portions of data and associated data attributes. The one or more data attributes are then displayed.

18 Claims, 11 Drawing Sheets

| Files in directory /usr/tmp/ | | | |
|---|---|---|---|
| Filename △ | Size | File | |
| file1.txt | 10k | Text | |
| file2.jpeg | 1.3M | Image | |
| file3.xml | 35k | XML | |
| file4.mp4 | 103M | Movie | 2003/08/22 11:00 |
| file5.tiff | 3.2M | Image | 2003/09/15 18:33 |

Select attribute from list
- Modification Date — 502
- Creation Date — 504
- Permissions — 506
- Camera Model
- Camera Owner — 508

310, 510

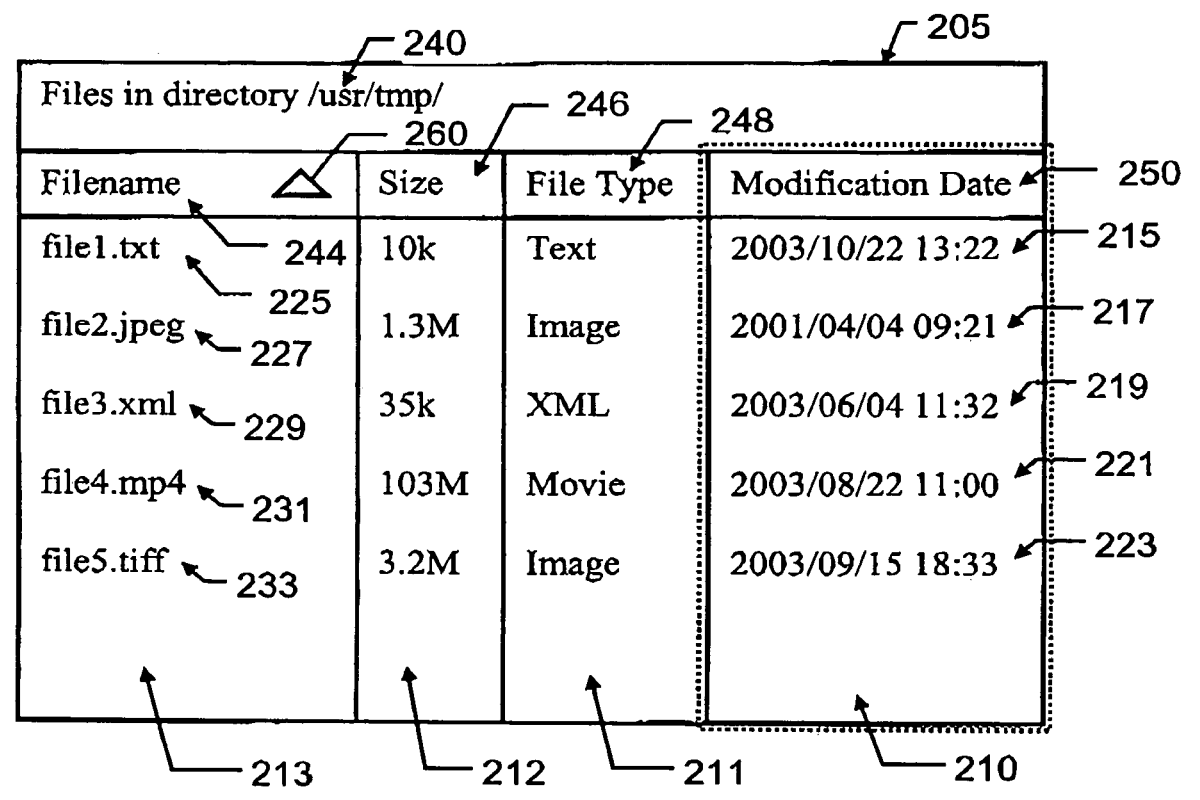

| Files in directory /usr/tmp/ | | | |
|---|---|---|---|
| Filename △ | Size | File Type | Modification Date |
| file1.txt | 10k | Text | 2003/10/22 13:22 |
| file2.jpeg | 1.3M | Image | 2001/04/04 09:21 |
| file3.xml | 35k | XML | 2003/06/04 11:32 |
| file4.mp4 | 103M | Movie | 2003/08/22 11:00 |
| file5.tiff | 3.2M | Image | 2003/09/15 18:33 |

Fig. 2

| Files in directory /usr/tmp/ | | | |
|---|---|---|---|
| Filename △ | Size | File Type | Select attribute from list |
| file1.txt | 10k | Text | Modification Date — 322 |
| file2.jpeg | 1.3M | Image | Creation Date — 324<br>Permissions — 326 |
| file3.xml | 35k | XML | Camera Model<br>Camera Owner — 328 |
| file4.mp4 | 103M | Movie | 2003/08/22 11:00 — 330 |
| file5.tiff | 3.2M | Image | 2003/09/15 18:33 |

| Files in directory /usr/tmp/ | | | | 205 |
|---|---|---|---|---|
| Filename △ | Size | File Type | Camera Model | 250 |
| file1.txt | 10k | Text | | |
| file2.jpeg | 1.3M | Image | Canon S50 | |
| file3.xml | 35k | XML | | |
| file4.mp4 | 103M | Movie | Canon XL-1 | |
| file5.wav | 31.2M | Audio | | 210 |

Fig. 4

| Files in directory /usr/tmp/ | | | | — 310 |
|---|---|---|---|---|
| Filename △ | Size | File | Select attribute from list | |
| file1.txt | 10k | Text | Modification Date ■■■ | — 502 |
| file2.jpeg | 1.3M | Image | Creation Date ■■ | — 504 |
| file3.xml | 35k | XML | Permissions ■■ | — 506 |
| file4.mp4 | 103M | Movie | Camera Model ▭■ | — 508 |
| file5.tiff | 3.2M | Image | Camera Owner ▭■ | — 510 |
| | | | 2003/08/22 11:00 | |
| | | | 2003/09/15 18:33 | |

Fig. 5

METADATA DRIVEN USER INTERFACE

CROSS-REFERENCE TO RELATED PATENT APPLICATIONS

This application claims the right of priority under 35 U.S.C. §119 based on Australian Patent Application No. 2004903350, filed 21 Jun. 2004, which is incorporated by reference herein in its entirety as if fully set forth herein.

FIELD OF THE INVENTION

The present invention relates generally to the use of data attributes in a user interface and, in particular, to the adaptive display of data attributes. The present invention also relates to a method and apparatus for changing displayed data attributes, and to a computer program product including a computer readable medium having recorded thereon a computer program for changing displayed data attributes.

BACKGROUND

Typically, digitally stored data have one or more associated "data attributes" (also known as metadata). These data attributes may be generated directly from the stored data. For example, a data attribute representing a size of the stored data may be generated. Data attributes may be embedded within data. For example, a data attribute representing a camera type may be embedded within JPEG (Joint Photographic Experts Group) standard data. Further, data attributes may be stored separately to the data itself and linked to associated data. For example, data attributes representing a file name, creation date, modification date, and owner may be linked to a file comprising data.

File systems allow a user to display data stored within the file system. Such file systems also allow data attributes associated with the stored data to be displayed. When displaying data in such a file system, a user may be presented with a fixed subset of data attributes according to one or more different data attribute types (e.g., file size, file type and modification date) associated with the stored data. For example, FIG. 2 shows a window 205 of a file browser software application listing the names of files (e.g., 225) of a file system in a column 213. The window 205 also includes three columns 212, 211 and 210, listing data attributes representing file size, file type and modification date, respectively, for the files 225, 227, 229, 231 and 233. These data attributes may be presented in the window 205 by default. Accordingly, a particular type of data attribute may be displayed for the stored data even though the particular type of data attribute may only apply to a small number or even none of the stored data files. For example, the modification date data attribute may exist for only a small number of the stored data files. However, when a user displays the stored data of the file system in the file browser window 205, for example, the user may be presented with the column 210 even though only one of the files (e.g., 225) or none of the files has a modification date data attribute associated with the file 225.

Many file systems allow a user to choose which types of data attributes will be displayed together with associated data and the order in which the data attributes will be displayed. When displaying types of data attributes that do not apply to all data being displayed, a data attribute display area may be left blank for a particular portion of data to which the displayed data attributes do not apply. For example, the data attributes 219, 221 and 223 may not appear in the column 210 if modification date data did not exist for the files 229, 231 and 233. Alternatively, a default value, placeholder string or graphic may be displayed in the data attribute column 210 associated with the files to which the data attributes do not apply.

When displaying data attributes, it is common for a user to sort displayed data according to data attributes by selecting a header (e.g., the header 250 of the column 216) for a particular data attribute. For example, in Microsoft® Explorer® a user may sort by a "Modification Date" data attribute, by clicking on a column header for the column listing the "Modification Date" data attribute. In addition, the direction of a sort may be indicated in the column header for a particular data attribute. In the case of Windows® Explorer®, the direction of a sort is typically displayed as a triangle (e.g., the triangle 260 of FIG. 2) pointing up or down. The user may perform other actions on a data attribute header (e.g., 250) by using a secondary selection mechanism (e.g., by 'right-clicking' a conventional mouse or by performing a control-select) on the header. These other actions may include the ability to change the actual data attributes being displayed to one of a number of other possible data attributes that may be displayed. However, in order to change the data attributes being displayed, the user typically must scroll through a long list of the other possible types of data attributes (e.g., displayed in a drop down menu) even though some of these other possible types of data attributes may not even apply to the data displayed in the list.

Thus, a need clearly exists for a more efficient method of changing displayed data attributes.

SUMMARY

It is an object of the present invention to substantially overcome, or at least ameliorate, one or more disadvantages of existing arrangements.

According to one aspect of the present invention there is provided a method of displaying one or more data attributes, the displayed data attributes being associated with one or more portions of data, said method comprising the steps of:

dynamically compiling a list of one or more data attribute types according to an analysis of the one or more portions of data and associated data attributes; and displaying the one or more data attributes.

According to another aspect of the present invention there is provided a method of changing displayed data attributes, the displayed data attributes being associated with one or more portions of data, said method comprising the steps of:

dynamically compiling statistics for each of one or more data attribute types according to an analysis of the one or more portions of data;

displaying the one or more data attribute types together with the compiled statistics; and changing one or more of the displayed data attributes upon selection of one or more of the data attribute types using the list.

According to still another aspect of the present invention there is provided a method of changing displayed data attributes, the displayed data attributes being associated with one or more portions of data, said method comprising the steps of:

dynamically compiling a list of one or more data attribute types according to an analysis of the one or more portions of data;

selecting one or more data attributes associated with the one or more data portions upon selection of one or more of the data attribute types using the list; and changing the displayed data attributes according to the selected one or more data attributes.

According to still another aspect of the present invention there is provided a method of changing displayed data attributes, the displayed data attributes being associated with one or more portions of data, said method comprising the steps of:

dynamically compiling a list of one or more data attribute types according to an analysis of the one or more portions of data and associated data attributes; and changing one or more of the displayed data attributes upon selection of one or more of the data attribute types using the list.

According to still another aspect of the present invention there is provided an apparatus for displaying one or more data attributes, the displayed data attributes being associated with one or more portions of data, said apparatus comprising:

compiler for dynamically compiling a list of one or more data attribute types according to an analysis of the one or more portions of data and associated data attributes; and display for displaying the one or more data attributes.

According to still another aspect of the present invention there is provided an apparatus for changing displayed data attributes, the displayed data attributes being associated with one or more portions of data, said apparatus comprising:

compiler for dynamically compiling statistics for each of one or more data attribute types according to an analysis of the one or more portions of data;

display for displaying the one or more data attribute types together with the compiled statistics; and changing means for changing one or more of the displayed data attributes upon selection of one or more of the data attribute types using the list.

According to still another aspect of the present invention there is provided an apparatus for changing displayed data attributes, the displayed data attributes being associated with one or more portions of data, said apparatus comprising:

compiler for dynamically compiling a list of one or more data attribute types according to an analysis of the one or more portions of data; and selector for selecting one or more data attributes associated with the one or more data portions upon selection of one or more of the data attribute types using the list; and changing means for changing the displayed data attributes according to the selected one or more data attributes.

According to still another aspect of the present invention there is provided an apparatus for changing displayed data attributes, the displayed data attributes being associated with one or more portions of data, said apparatus comprising:

compiler for dynamically compiling a list of one or more data attribute types according to an analysis of the one or more portions of data and associated data attributes; and changing means for changing one or more of the displayed data attributes upon selection of one or more of the data attribute types using the list.

According to still another aspect of the present invention there is provided a program for displaying one or more data attributes, the displayed data attributes being associated with one or more portions of data, said method program comprising:

code for dynamically compiling a list of one or more data attribute types according to an analysis of the one or more portions of data and associated data attributes; and code for displaying the one or more data attributes.

According to still another aspect of the present invention there is provided a program for changing displayed data attributes, the displayed data attributes being associated with one or more portions of data, said program comprising:

code for dynamically compiling statistics for each of one or more data attribute types according to an analysis of the one or more portions of data;

code for displaying the one or more data attribute types together with the compiled statistics; and code for changing one or more of the displayed data attributes upon selection of one or more of the data attribute types using the list.

According to still another aspect of the present invention there is provided a program for changing displayed data attributes, the displayed data attributes being associated with one or more portions of data, said program comprising:

code for dynamically compiling a list of one or more data attribute types according to an analysis of the one or more portions of data; and code for selecting one or more data attributes associated with the one or more data portions upon selection of one or more of the data attribute types using the list; and changing the displayed data attributes according to the selected one or more data attributes.

According to still another aspect of the present invention there is provided a program for changing displayed data attributes, the displayed data attributes being associated with one or more portions of data, said program comprising:

code for dynamically compiling a list of one or more data attribute types according to an analysis of the one or more portions of data and associated data attributes; and code for changing one or more of the displayed data attributes upon selection of one or more of the data attribute types using the list.

According to still another aspect of the present invention there is provided a computer program product comprising a computer readable medium having recorded thereon a computer program for displaying one or more data attributes, the displayed data attributes being associated with one or more portions of data, said method program comprising:

code for dynamically compiling a list of one or more data attribute types according to an analysis of the one or more portions of data and associated data attributes; and code for displaying the one or more data attributes.

According to still another aspect of the present invention there is provided a computer program product comprising a computer readable medium having recorded thereon a computer program for changing displayed data attributes, the displayed data attributes being associated with one or more portions of data, said program comprising:

code for dynamically compiling statistics for each of one or more data attribute types according to an analysis of the one or more portions of data;

code for displaying the one or more data attribute types together with the compiled statistics; and code for changing one or more of the displayed data attributes upon selection of one or more of the data attribute types using the list.

According to still another aspect of the present invention there is provided a computer program product comprising a computer readable medium having recorded thereon a computer program for a program for changing displayed data attributes, the displayed data attributes being associated with one or more portions of data, said program comprising:

code for dynamically compiling a list of one or more data attribute types according to an analysis of the one or more portions of data; and code for selecting one or more data attributes associated with the one or more data portions upon selection of one or more of the data attribute types using the list; and changing the displayed data attributes according to the selected one or more data attributes.

According to still another aspect of the present invention there is provided a computer program product comprising a computer readable medium having recorded thereon a computer program for a program for changing displayed data attributes, the displayed data attributes being associated with one or more portions of data, said program comprising:

code for dynamically compiling a list of one or more data attribute types according to an analysis of the one or more portions of data and associated data attributes; and code for changing one or more of the displayed data attributes upon selection of one or more of the data attribute types using the list.

Other aspects of the invention are also disclosed.

BRIEF DESCRIPTION OF THE DRAWINGS

One or more embodiments of the present invention will now be described with reference to the drawings and appendices, in which:

FIG. 2 shows a window of a file browser software application;

FIG. 3 shows the window of FIG. 2 including another window displaying a list of possible data attribute types;

FIG. 4 shows the window of FIG. 2 following the selection of another data attribute for display;

FIG. 5 shows the window of FIG. 2 including another window displaying a list of possible data attribute types and additional data indicating the percentage of files to which particular data attributes apply;

DETAILED DESCRIPTION INCLUDING BEST MODE

Figure 1:
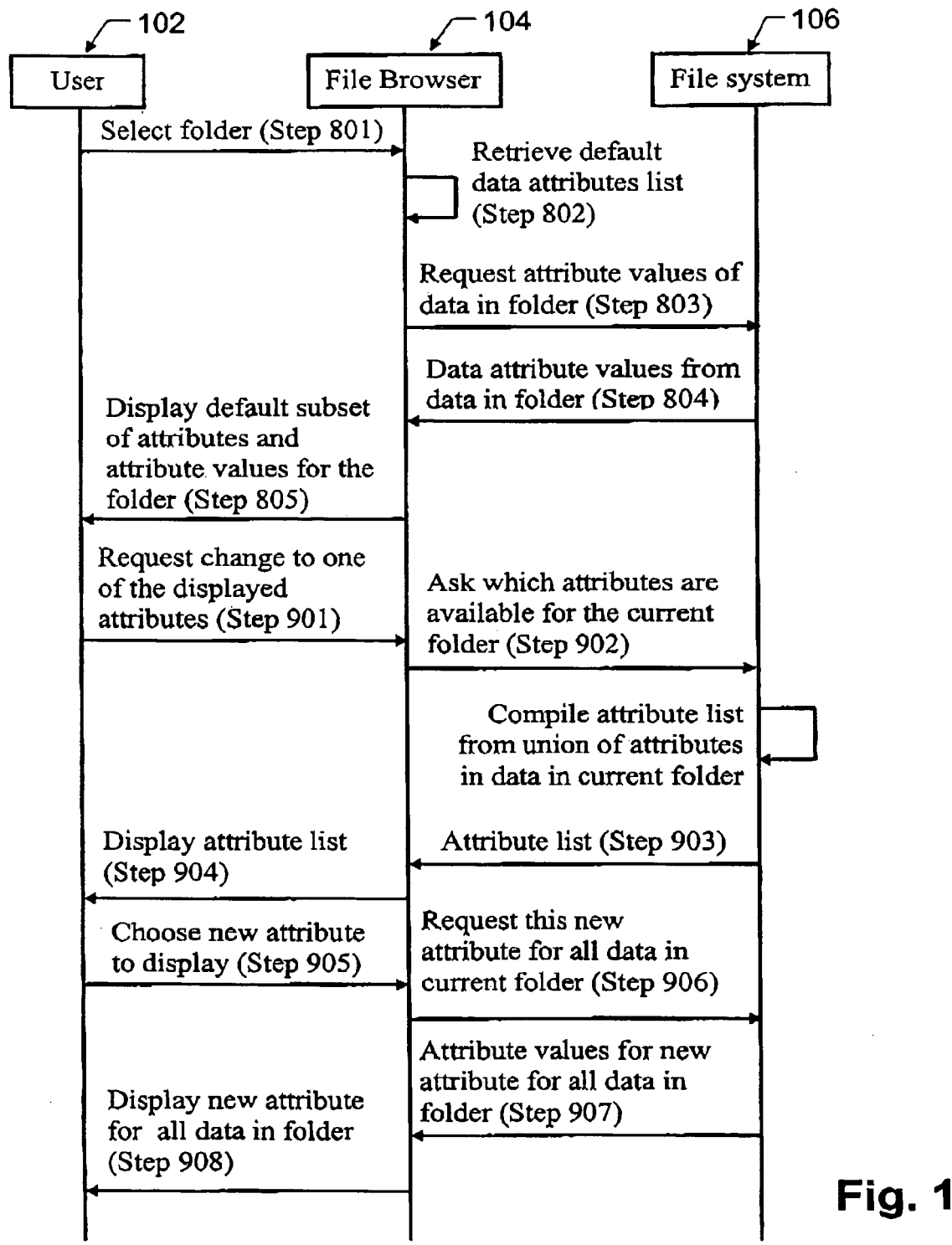
FIG. 1 is a sequence diagram showing a sequence of operations for displaying data attributes and changing displayed data attributes.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Methods for displaying data attributes are described below. Methods for changing displayed data attributes are also described. The methods described herein may be practiced using a general-purpose computer system 700, such as that shown in FIG. 7 wherein the processes of FIGS. 1 to 6 and 8 to 11 may be implemented as software, such as a file browser executing within the computer system 700. The window 205 for such a file browser is shown in FIG. 2. The window 205 displays various data attributes 215-223 associated with each file 225-233 being viewed. The window 205 may be altered to display different columns (e.g., 210) of data attributes. A list of possible data attribute types that may be displayed within the window 205 may be taken from data attributes belonging to or associated with current data (e.g., a file comprising data) being displayed.

In one implementation, the processes of FIGS. 1 to 6 and 8 to 11 may be implemented as one or more code modules of a Web browser executing within the computer system 700. In this instance, the Web browser may display the various data attributes 215, 217, 219, 221 and 223 using one or more of the methods known in the art, such as Javascript™ or Scalable Vector Graphics (SVG).

The steps of the described methods may be effected by instructions in the software that are carried out by the computer. The instructions may be formed as one or more code modules, each for performing one or more particular tasks. The software may also be divided into two separate parts, in which a first part performs the described methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for implementing the described methods.

The computer system 700 is formed by a computer module 701, input devices such as a keyboard 702 and mouse 703, output devices including a printer 715, a display device 714 and loudspeakers 717. A Modulator-Demodulator (Modem) transceiver device 716 is used by the computer module 701 for communicating to and from a communications network 720, for example connectable via a telephone line 721 or other functional medium. The modem 716 can be used to obtain access to the Internet, and other network systems, such as a Local Area Network (LAN) or a Wide Area Network (WAN), and may be incorporated into the computer module 701 in some implementations.

The computer module 701 typically includes at least one processor unit 705, and a memory unit 706, for example formed from semiconductor random access memory (RAM) and read only memory (ROM). The module 701 also includes an number of input/output (I/O) interfaces including an audio-video interface 707 that couples to the video display 714 and loudspeakers 717, an I/O interface 713 for the keyboard 702 and mouse 703 and optionally a joystick (not illustrated), and an interface 708 for the modem 716 and printer 715. In some implementations, the modem 716 may be incorporated within the computer module 701, for example within the interface 708. A storage device 709 is provided and typically includes a hard disk drive 710 and a floppy disk drive 711. A magnetic tape drive (not illustrated) may also be used. A CD-ROM drive 712 is typically provided as a non-volatile source of data. The components 705 to 713 of the computer module 701, typically communicate via an interconnected bus 704 and in a manner which results in a conventional mode of operation of the computer system 700 known to those in the relevant art. Examples of computers on which the described arrangements can be practised include IBM-PC's and compatibles, Sun Sparcstations or alike computer systems evolved therefrom.

Typically, the application program is resident on the hard disk drive 710 and read and controlled in its execution by the processor 705. Intermediate storage of the program and any data fetched from the network 720 may be accomplished using the semiconductor memory 706, possibly in concert with the hard disk drive 710. In some instances, the application program may be supplied to the user encoded on a CD-ROM or floppy disk and read via the corresponding drive 712 or 711, or alternatively may be read by the user from the network 720 via the modem device 716. Still further, the software can also be loaded into the computer system 100 from other computer readable media. The term "computer readable medium" as used herein refers to any storage or transmission medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 701. Examples of transmission media include radio or infra-red transmission channels as well as a network connection to another computer or networked device, and the Internet or Intranets including e-mail transmissions and information recorded on Websites and the like.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 8:
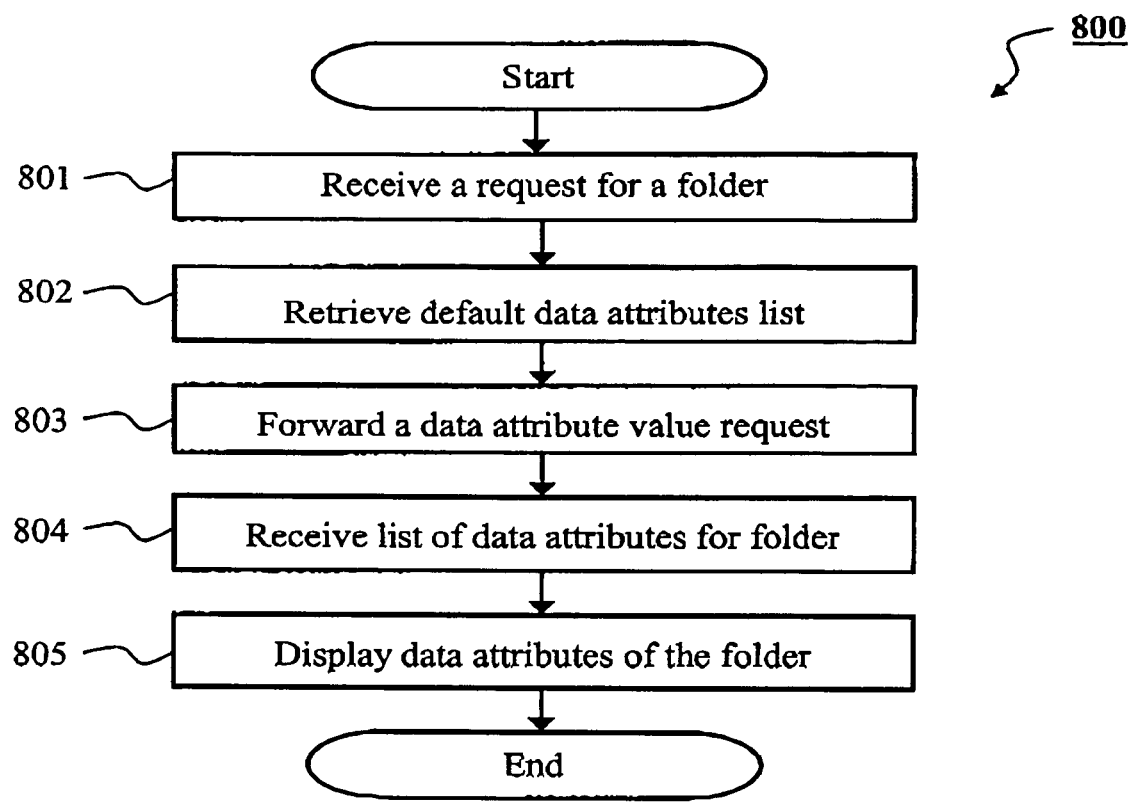
FIG. 8 shows a method of displaying data attributes.

A method 800 of displaying data attributes will now be described by way of example with reference to FIGS. 1 and 8. The method 800 may be implemented as software resident on the hard disk drive 710 and being controlled in its execution by the processor 705. The software implementing the method 800 may be formed as one or more code modules of a file browser software application 104. In the present example, the file browser 104 displays data attributes in a window (e.g., 205) generated by the file browser 104, for example. The window 205 generated by the file browser 104 may be used to browse files stored in a file system 106 resident on the hard disk drive 710. Alternatively, the file system 106 may be stored remotely to the computer system 700 or a server 750.

The method 800 begins at step 801 where the file browser 104 being executed by the processor 705 receives a request for a folder selected by a user 102. The pathname 240 for the folder is shown in window 205. The folder represented by the pathname 240 will be referred to hereinafter as the "folder 240". The folder 240 is one of the folders of the file system 106. In the implementation of the Web browser described above, data and associated data attributes may be accessed, via the communications network 720, from a file system, database, spreadsheet or any other storage means resident on the server 750.

The user 102 may select the folder 240 using the file browser 104 according to any conventional method, including by entering the pathname of the folder 240 via the keyboard 702 or by selecting an icon representing the folder 240 using the mouse 703 in a conventional manner. The user may also select the folder 240 by selecting the pathname for the folder 240 from a folder tree display, for example, or by selecting a representative icon from a file browser display.

Alternatively, the user may select the folder 240 by operating a search. At the next step 802, the file browser 205 retrieves a default data attributes list from memory 706, for example. The default data attributes list includes details of one or more data attribute types that are to be retrieved. For example, the default data attributes list may state that file size, file type, modification date, creation date, permissions, camera model and camera owner type data attributes are to be retrieved. Then at the next step 803, the file browser 104 forwards a data attribute value request to the file system 106. The data attribute value request includes the data attribute types listed in the default data attributes list and details of the folder 240.

At the next step 804, the file browser 104 receives a list of data attributes for files or folders or other data content of the selected folder 240, from the file system 106. The list of data attributes is compiled by the file system 106 according to the types of data attributes listed in the default data attributes list received by the file system 106 in the data attribute value request. Accordingly, the file data attributes list includes data attributes of the type listed in the default data attributes list. Any data attributes of a type not included in the default data attributes list are not included in the list of data attributes received by the file browser 104 at step 804. Then at the next step 805, the data attributes for files or folders or other data content of the selected folder 240 received from the file system 106 are displayed in columns (e.g., 210) of the window (e.g., 205) on the display 714.

The file browser 104 may also determine additional information and statistics pertaining to the data attributes received from the file system 106. For example, the file browser 104 may determine the percentage of files of the selected folder 204 that have values for each data attribute in the default data attributes list. The additional information may also be displayed in the window 205 on the display 714. The additional information may then be used to decide the order of display of the data attributes retrieved from the file system 106. The additional information may also be displayed together with each data attribute, as will be described below.

Figure 9:
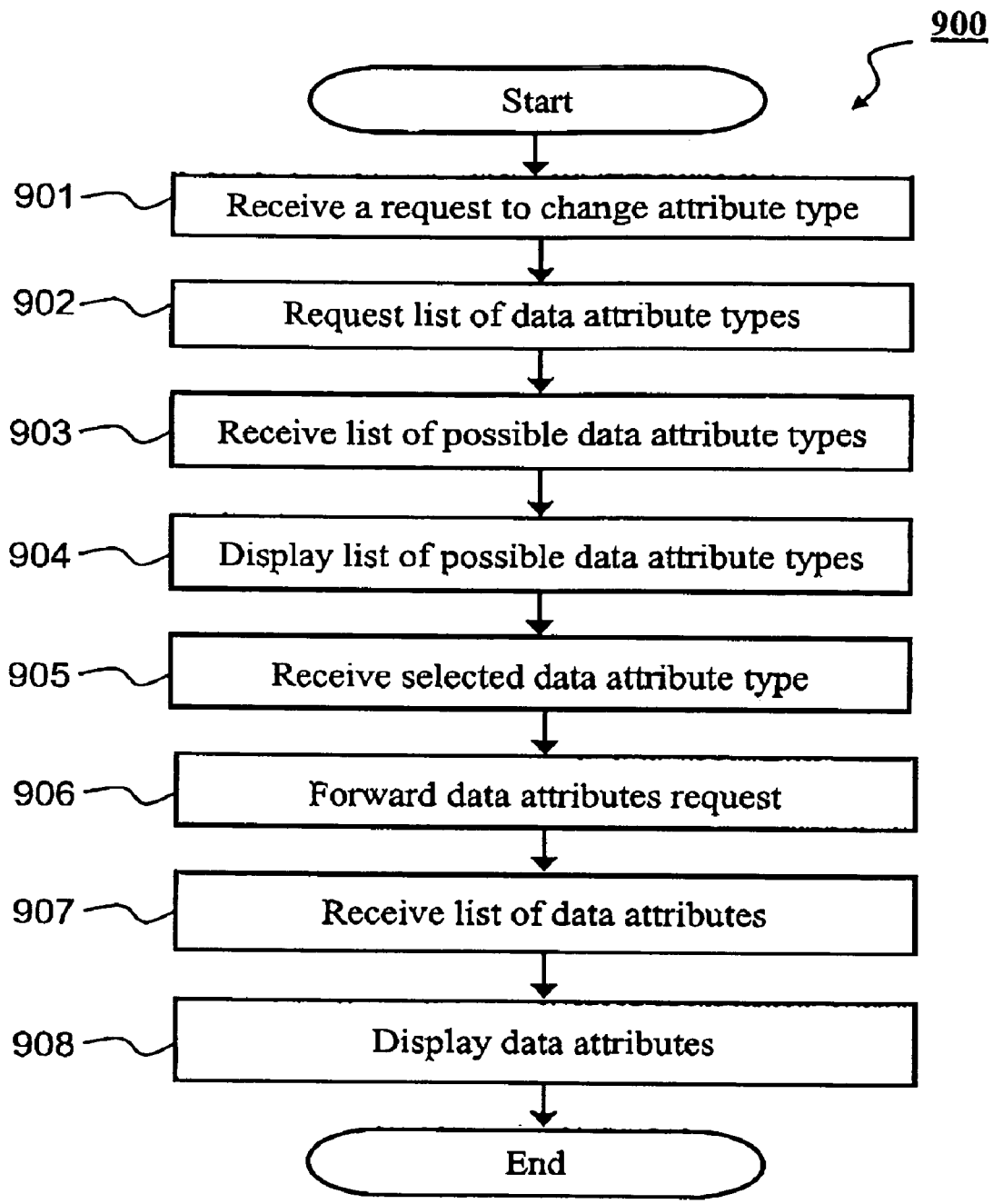
FIG. 9 shows a method of changing displayed data attributes.

A method 900 of changing displayed data attributes will now be described by way of the present example with reference to FIGS. 1 and 9. The data attributes may have been displayed according to the method 800. Alternatively, the data attributes may have been displayed in accordance with another method or configuration. The method 900 may be implemented as software resident on the hard disk drive 710 and being controlled in its execution by the processor 705. The software implementing the method 900 may be formed as one or more code modules of the file browser 104.

The method 900 begins at step 901 where the file browser 104 being executed by the processor 705 receives a request to change one of types of data attributes being displayed. The request to change one of the types of data attributes being displayed may be generated by the processor 705 in response to a user selecting an appropriate column header (e.g., 250) of the window 205. The selection of the column header 250 at step 901 may be performed in accordance with a secondary selection mechanism (e.g., by 'right-clicking' the mouse 703 or by performing a control-select using the keyboard 702) so that the selection of the column header 250 does not effect the normal selection of the column headers (e.g., 246, 248 and 250) for the purposes of sorting.

At the next step 902, the file browser 104 requests a list of data attribute types that may be displayed in the column (e.g., 210) selected at step 901, from the file system 106. Then at step 903, the file browser 104 receives a list of possible data attribute types from the file system 106. The list of possible data attribute types may be compiled by the file system 106 following an analysis of the data in the current folder 240. The file system 106 may determine all of the data attributes within, attached to, or derived from each data value in the current folder 240, and add each of the different data attribute types for those data attributes to the list of possible data attribute types. The list of possible data attribute types may be configured in memory 706. Alternatively, the file system 106 may maintain a count of the number of times that data of the current folder 240 is associated with a particular data attribute type (e.g., modification date) and determine the list of possible data attribute types on the basis of the count. For example, if creation date data is associated with most of the data of the current folder 240, then the creation date data attribute type may be added to the list of possible data attribute types. Whereas if a data attribute indicating camera model number is only associated with a small amount of data of the current folder, then a camera model number data attribute type may be not added to the list of possible data attribute types. The file system 106 may also exclude, from the list of possible data attribute types, those data attribute types that were being displayed in the window 205 by the file browser 104 prior to the request at step 901.

The method 900 continues at the next step 904 where the list of possible data attribute types is displayed on the display 714. For example, the list of possible data attribute types may be displayed in a window such as the window 310, as seen in FIG. 3. As seen in FIG. 3, the window 310 includes a list of data attribute types including modification date 322, creation date 324, permissions 326, camera model 328 and camera owner 330. The file browser 104 may also determine additional information and statistics pertaining to the data attributes received from the file system 106. For example, the file browser 104 may determine the percentage of files of the selected folder 204 that have values for each data attribute.

The additional information determined by the file browser 104 may also be displayed in the window 205 on the display 714. In one implementation, the window 310 may display the additional information such as an indication as to the percentage of files of the selected folder 204 that have values for each data attribute type. For example, as seen in FIG. 5, each of the data attribute types 322, 324, 326, 328 and 330 includes a fill bar 502, 504, 506, 508 and 510, respectively, indicating the percentage of files in the file system 106 to which the particular data attribute type applies.

At the next step 905 of the method 900, the browser 104 being executed by the processor 705 receives details of a data attribute type (e.g., camera model 328) that has been selected from the list of possible data attribute types. The data attribute type received by the browser 104 at step 905 may be selected by a user, from the list of possible data attribute types displayed in the window 310, using the mouse 703 in a conventional manner. Alternatively, the data attribute type received by the browser 104 may be selected using any other method such as entering the name of a particular data attribute type via the keyboard 702.

Then at the next step 906, the file browser 104 forwards a data attribute value request to the file system 106. The data attribute value request includes the data attribute type (e.g., camera model 328) selected at step 905 and details of the folder 240. At the next step 907, the file browser 104 receives a list of data attributes for files or folders or other data content of the selected folder 240, from the file system 106, according to the data attribute type in the data attribute value request. The file system 106 compiles the list of data attributes forwarded to the file browser 104 following an analysis of the data in the current folder 240. The file system 106 may determine all of the data attributes within, attached to, or derived from each data item in the current folder 240, of the data attribute type in the data attribute value request and add each of the data attributes to the list of data attributes forwarded to the file browser 104 at step 907. The method 900 concludes at the next step 908, where the data attributes for files or folders or other data content of the selected folder 240 received from the file system 106 are displayed in the column (e.g., 210) selected at step 901 in place of the data attribute values previously displayed in the selected column. For example, as seen in FIG. 4, the data attribute values for the modification date type data attribute 322 of column 210 have been replaced with data attribute values for the camera model type data attribute 328. As seen in FIG. 4, a blank space is left in the column 210 along side files for which a camera model type data attribute 328 does not exist.

Figure 6:
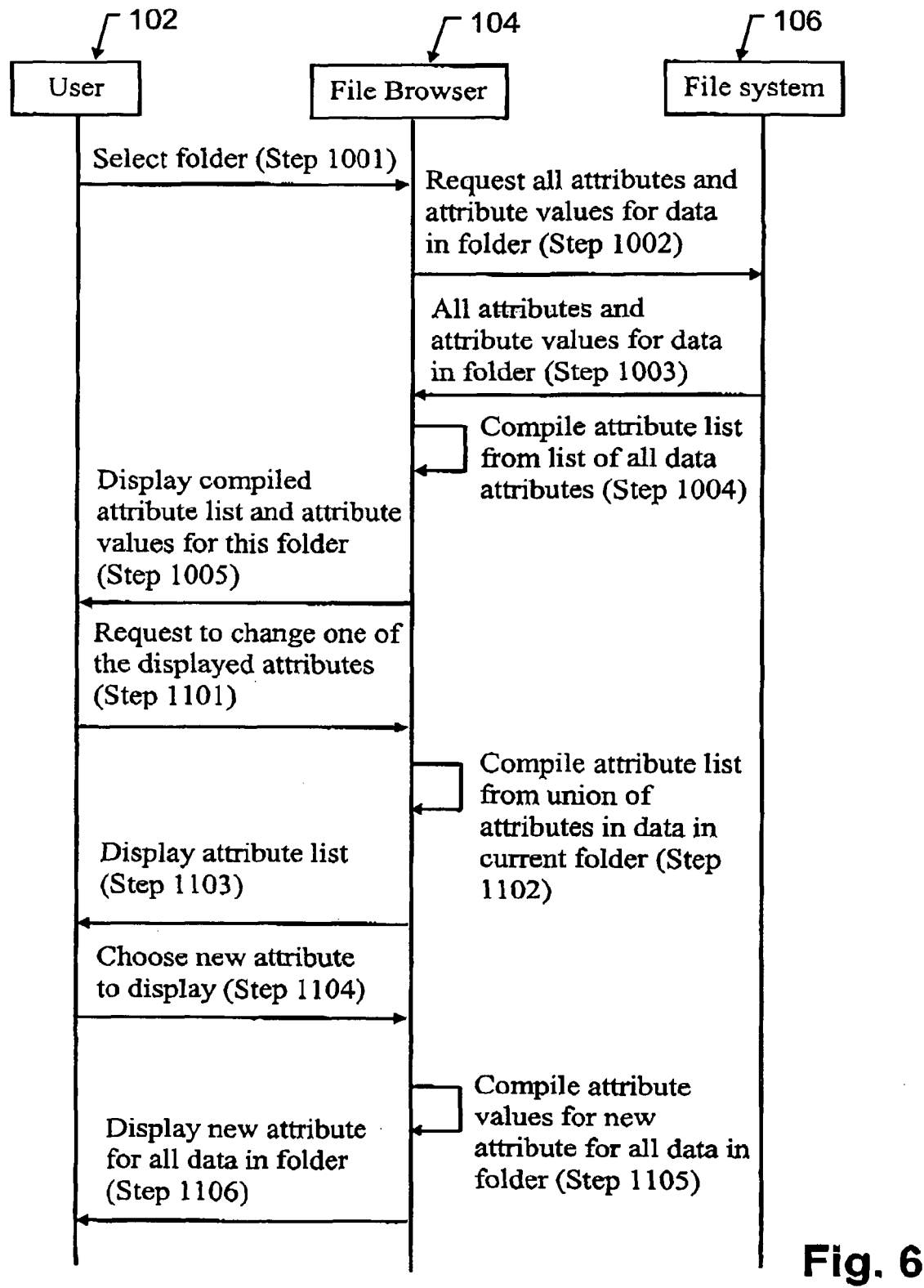
FIG. 6 is a sequence diagram showing another sequence of operations for displaying data attributes and changing displayed data attributes.
Figure 7:
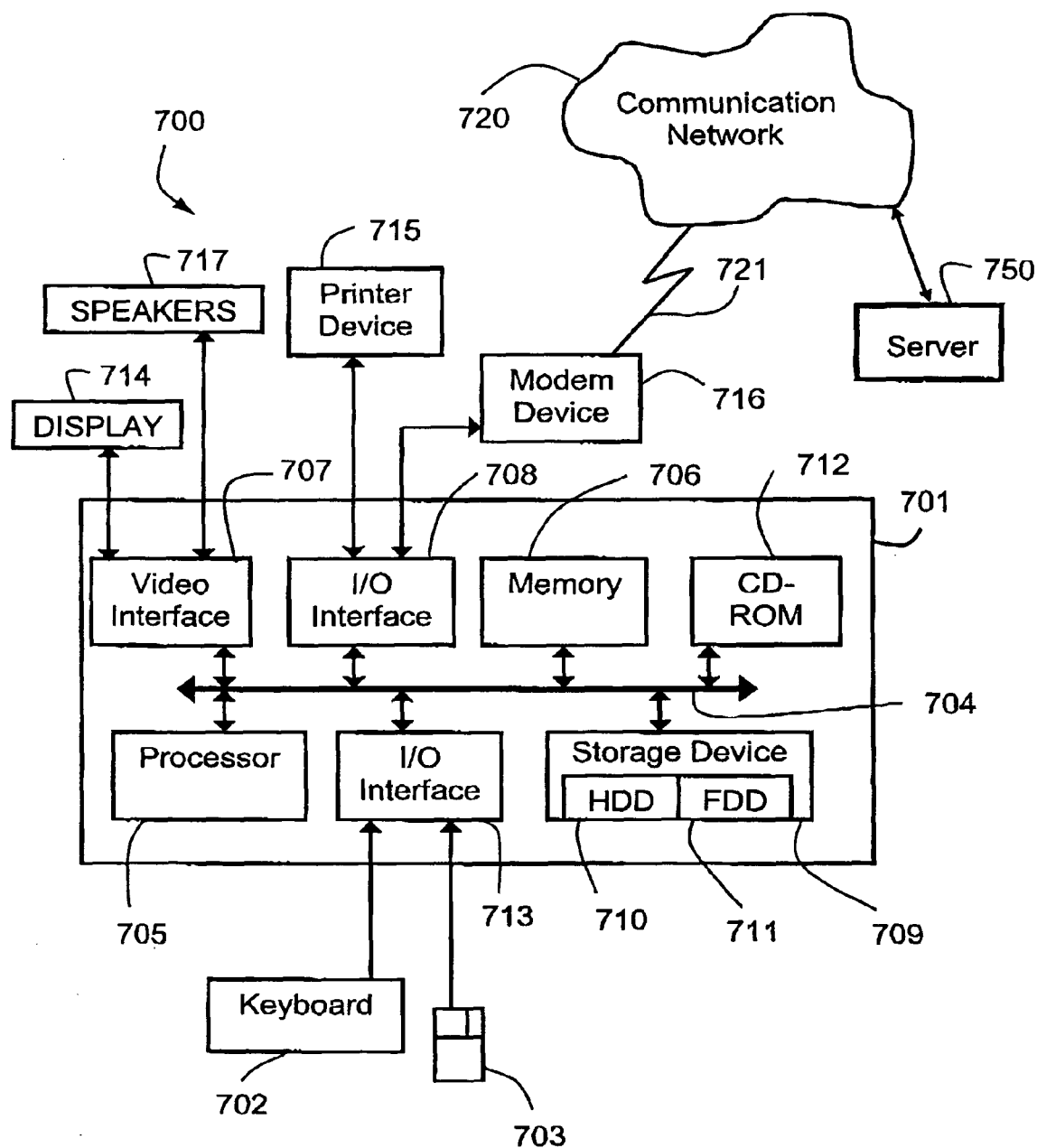
FIG. 7 is a schematic block diagram of a general-purpose computer upon which arrangements described can be practiced.
Figure 10:
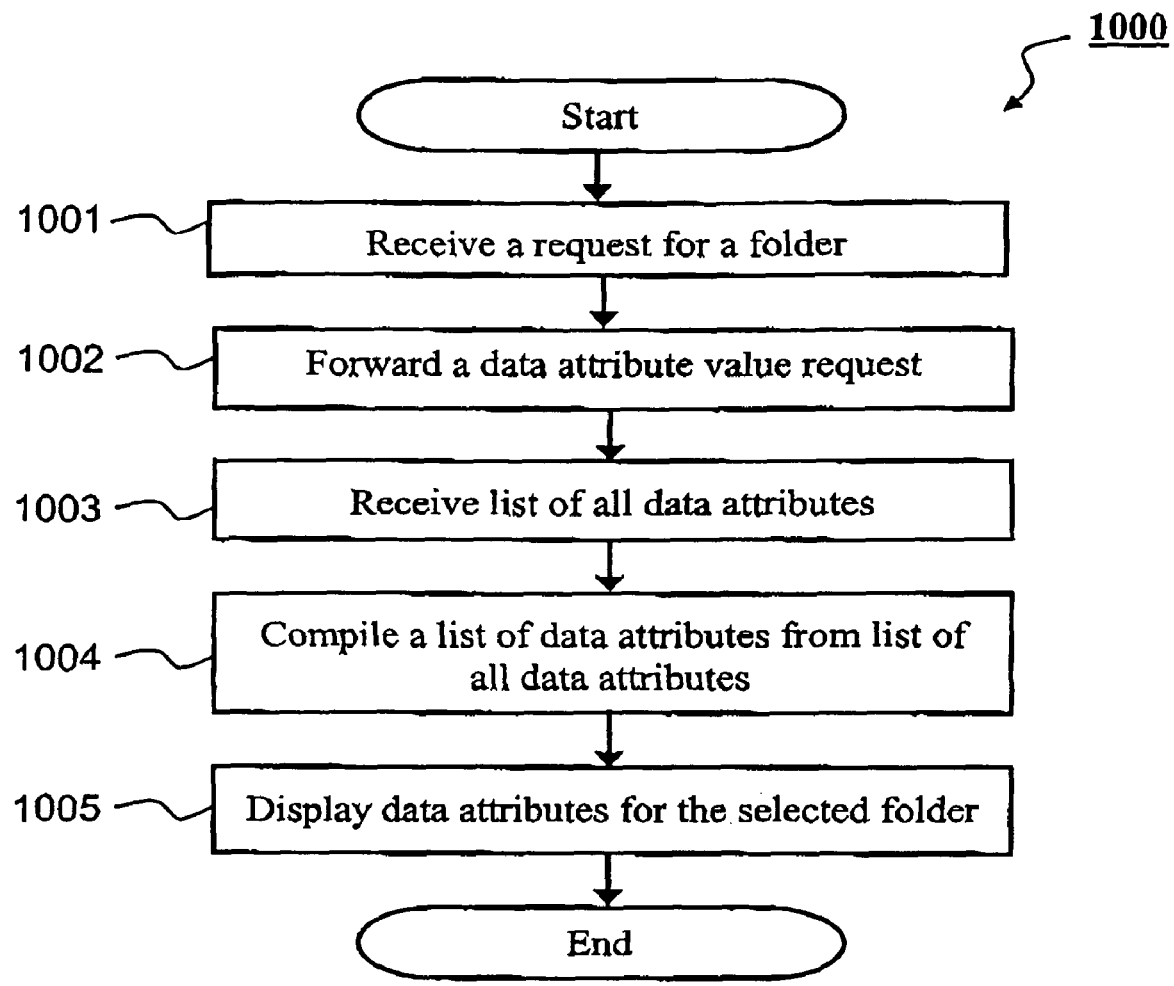
FIG. 10 shows another method of displaying data attributes.

A method 1000 of displaying data attributes will now be described by way of another example with reference to FIGS. 6 and 10. The method 1000 may be implemented as software resident on the hard disk drive 710 and being controlled in its execution by the processor 705. The software implementing the method 1000 may be formed as one or more code modules of the file browser 104. In the present example, the file browser 104 displays data attributes in a window (e.g., 205) generated by the file browser 104. Again, the window 205 generated by the file browser 104 may be used to browse files stored in a file system 106 resident on the hard disk drive 710. Alternatively, the file system 106 may be stored remotely to the computer module 701, for example, on the server 750.

The method 1000 begins at step 1001 where the file browser 104 being executed by the processor 705 receives a request for a folder (e.g., 240) selected by the user 102. The user 102 may select the folder 240 from the file browser 104 using any conventional method, including by entering the pathname for the folder 240 via the keyboard 702 or by selecting an icon representing the folder using the mouse 703 in a conventional manner. The user may also select the folder 240 by selecting the pathname for the folder 240 from a folder tree display, for example, or by selecting a representative icon from a file browser display. Alternatively, the user may select the folder 240 by operating a search. At the next step 1002, the file browser 104 forwards a data attribute value request to the file system 106 resident on the hard disk drive 110 and being executed by the processor 705. In this instance, the data attribute value request includes the details of the folder 240.

At the next step 1003, the file browser 104 receives a list of all data attributes for files or folders or other data content of the selected folder 240, from the file system 106. Then at the next step 1004, the file browser 104 compiles a list of data attributes from the list of all data attributes received from the file system 106. Then at the next step 1005, the data attributes for files or folders or other data content of the selected folder 240 compiled by the file browser 104 at step 1004 are displayed in columns (e.g., 210) of the window (e.g., 205) on the display 714.

Figure 11:
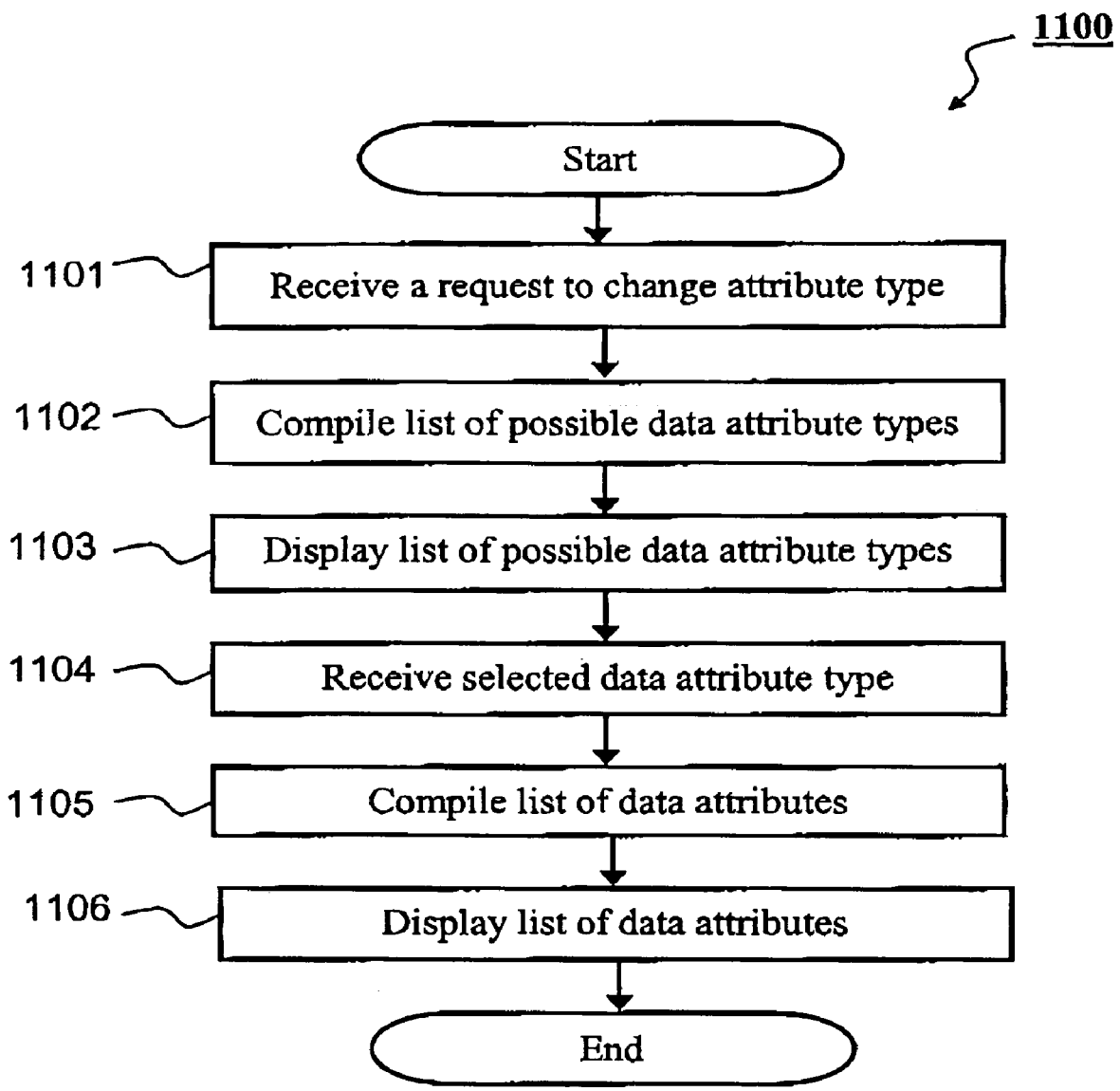
FIG. 11 shows another method of changing displayed data attributes.

A method 1100 of changing displayed data attributes will now be described by way of the present example with reference to FIGS. 6 and 11. The data attributes may have been displayed according to either one of the methods 800 or 1000. Alternatively, the data attributes may have been displayed in accordance with another method or configuration. The method 1100 may be implemented as software resident on the hard disk drive 710 and being controlled in its execution by the processor 705. The software implementing the method 1100 may be formed as one or more code modules of the file browser 104.

The method 1100 begins at step 1101 where the file browser 104 being executed by the processor 705 receives a request to change one of types of data attributes being displayed. The request to change one of the types of data attributes may be generated by the processor 705 in response to a user selecting an appropriate column header (e.g., 250) of the window 205. The selection of the column header 250 at step 1101 may be performed in accordance with a secondary selection mechanism (e.g., by 'right-clicking' the mouse 703 or by performing a control-select using the keyboard 702) so that the selection of the column header 250 does not effect the normal selection of the column headers (e.g., 250) for the purposes of sorting.

At the next step 1102, the file browser 104 compiles a list of possible data attribute types for display in the column 210. The list of possible data attribute types may be compiled by the file browser 104 following an analysis of the data received from the current folder 240 at step 1003 or 804. The file browser 104 may determine all of the data attributes within, attached to, or derived from each data value received from the current folder 240, and add each of the different data attribute types for those data attributes to the list of possible data attribute types. The list of possible data attribute types may be configured in memory 706. Alternatively, the file browser 104 may maintain a count of the number of times that data received from the current folder 240 refers to a particular data attribute type (e.g., modification date) and determine the list of possible data attribute types on the basis of the count.

The method 1100 continues at the next step 1103 where the list of possible data attribute types compiled by the file browser 104 at step 1102 is displayed on the display 714. For example, the list of possible data attribute types may be displayed in the window 310, as seen in FIG. 3. At the next step 1104, the browser 104 being executed by the processor 705 receives details of a data attribute type (e.g., camera model 328) that has been selected from the list of possible data attribute types. The data attribute type received by the browser 104 at step 1104 may be selected by a user, from the list of possible data attribute types displayed in the window 310, using the mouse 703 in a conventional manner. Alternatively, the data attribute type received by the browser 104 may be selected using any other method such as entering the name of a particular data attribute type via the keyboard 702.

Then at the next step 1105, the file browser 104 compiles a list of data attributes following an analysis of the data of the current folder 240 received from the file system 106 at step 1003. The file browser 104 may determine all of the data attributes within, attached to, or derived from each data value in the current folder 240, of the data attribute type selected by the user at step 1104 and add each of the data attributes to the list of data attributes. The method 1100 concludes at the next step 1106, where the data attributes for files or folders or other data content of the selected folder 240 compiled by the file browser 104 are displayed in the column (e.g., 210) selected at step 1104 in place of the data attribute values previously displayed in the selected column. For example, as seen in FIG. 4, the data attribute values for the modification date type data attribute 322 of column 210 have been replaced with data attribute values for the camera model type data attribute 328.

Accordingly, the list of possible data attributes compiled by the file system 106 as at step 903 and the list of possible data attributes compiled by the browser 104 as at step 1102, are determined according to the data attributes associated with the stored data. These lists of possible data attributes are not static lists of data attributes showing all of the possible data attribute types that may be associated with data.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather than sequentially.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of displaying one or more data attributes associated with a set of files stored in a file system, each of the files having associated therewith a plurality of different types of data attributes, said method comprising the steps of:

analyzing the files to determine which types of data attributes are associated with the set of files;

compiling a list of the different types of data attributes which are determined to be displayed with the set of files based on the analysis, the list including a count of a number of times that the set of files is associated with each of the different types of data attributes in the list; and displaying, for the set of files, the list of different types of data attributes, wherein each of the different types of data attributes is displayed with each corresponding indication of the count.

2. The method according to claim 1, wherein the data attributes are displayed upon selection of one or more of the data attribute types.

3. The method according to claim 1, further comprising the step of dynamically compiling statistics for each of the one or more data attribute types according to the analysis of the files.

4. The method according to claim 3, further comprising the step of displaying the compiled statistics for each of the one or more data attribute types.

5. The method according to claim 1, further comprising the step of selecting one or more data attributes associated with the one or more files for use in changing the displayed data attributes.

6. The method according to claim 5, wherein the selected data attributes are of the type selected using the list.

7. The method according to claim 1, wherein the list is compiled in response to selection of one or more displayed data attributes of a particular type.

8. The method according to claim 1, further comprising the step of displaying the list to enable selection of the one or more of the data attribute types.

9. The method according to claim 1, wherein the list is compiled by a browser application.

10. The method according to claim 1, wherein the one or more files are stored together with the one or more displayed attributes.

11. The method according to claim 10, wherein the list is compiled locally to the stored files.

12. The method according to claim 10, wherein the list is compiled remotely to the stored files.

13. The method according to claim 12, wherein the list is compiled by a server.

14. A method of changing which data attributes associated with a set of files stored in a file system are displayed, each of the files having associated therewith a plurality of different types of data attributes, said method comprising the steps of:

analyzing the files to determine which types of data attributes are associated with the set of files;

displaying a set of files associated with a set of data attributes;

selecting a data attribute from the set of data attributes;

compiling a list of the different types of data attributes which are determined to be displayed with the set of files based on the analysis, the list including a count of a number of times that the set of files is associated with each of the different types of data attributes in the list;

displaying, for the set of files, the list of different types of data attributes, wherein each of the different types of data attributes is displayed with each corresponding indication of the count; and changing the displayed data attributes based on the selected data attribute.

15. An apparatus for displaying one or more data attributes associated with a set of files stored in a file system, each of the files of the set having associated therewith a plurality of different types of data attributes, said apparatus comprising:

a memory for storing data and a computer program;

a processor coupled to said memory for executing said computer program, said computer program comprising instructions for:

analyzing the files to determine which types of data attributes are associated with the set of files;

compiling a list of the different types of data attributes which are determined to be displayed with the set of files based on the analysis, the list including a count of a number of times that the set of files is associated with each of the different types of data attributes in the list; and displaying, for the set of files, the list of different types of data attributes, wherein each of the different types of data attributes is displayed with each corresponding indication of the count.

16. An apparatus for changing which data attributes associated with a set of files stored in a file system are displayed, each of the files of the set having associated therewith a plurality of different types of data attributes, said apparatus comprising:

a memory for storing data and a computer program;

a processor coupled to said memory for executing said computer program, said computer program comprising instructions for:

analyzing the files to determine which types of data attributes are associated with the set of files;

displaying a set of files associated with a set of data attributes;

selecting a data attribute from the set of data attributes;

compiling a list of the different types of data attributes which are determined to be displayed with the set of files based on the analysis, the list including a count of a number of times that the set of files is associated with each of the different types of data attributes in the list;

displaying, for the set of files, the list of different types of data attributes, wherein each of the different types of data attributes is displayed with each corresponding indication of the count; and changing the displayed data attributes based on the selected data attribute.

17. A computer-readable medium storing a program for causing a computer to display one or more data attributes associated with a set of files stored in a file system, each of the files of the set having associated therewith a plurality of different types of data attributes, said program comprising:

code for analyzing the files to determine which types of data attributes are associated with the set of files;

code for compiling a list of the different types of data attributes which are determined to be displayed with the set of files based on the analysis, the list including a count of a number of times that the set of files is associated with each of the different types of data attributes in the list; and code for displaying, for the set of files, the list of different types of data attributes, wherein each of the different types of data attributes is displayed with each corresponding indication of the count.

18. A computer-readable medium storing a program for changing which data attributes associated with a set of files stored in a file system are displayed, each of the files having associated therewith a plurality of different types of data attributes, said program comprising:

code for analyzing the files to determine which types of data attributes are associated with the set of files;

code for displaying a set of files associated with a set of data attributes;

code for selecting a data attribute from the set of data attributes;

code for compiling a list of the different types of data attributes which are determined to be displayed with the set of files based on the analysis, the list including a count of a number of times that the set of files is associated with each of the different types of data attributes in the list;

code for displaying, for the set of files, the list of different types of data attributes, wherein each of the different types of data attributes is displayed with each corresponding indication of the count; and code for changing the displayed data attributes based on the selected data attribute.

* * * * *